United States Patent
Shen et al.

(10) Patent No.: US 10,810,765 B2
(45) Date of Patent: Oct. 20, 2020

(54) IMAGE PROCESSING APPARATUS AND IMAGE PROCESSING METHOD

(71) Applicant: FUJITSU LIMITED, Kawasaki-shi, Kanagawa (JP)

(72) Inventors: Wei Shen, Beijing (CN); Rujie Liu, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 106 days.

(21) Appl. No.: 16/136,940

(22) Filed: Sep. 20, 2018

(65) Prior Publication Data
US 2019/0122394 A1 Apr. 25, 2019

(30) Foreign Application Priority Data
Oct. 19, 2017 (CN) .......................... 2017 1 0976964

(51) Int. Cl.
| | |
|---|---|
| *G06K 9/36* | (2006.01) |
| *G06T 9/00* | (2006.01) |
| *H04N 19/61* | (2014.01) |
| *G06N 3/04* | (2006.01) |
| *G06N 3/08* | (2006.01) |
| *H04N 19/90* | (2014.01) |

(52) U.S. Cl.
CPC ............ *G06T 9/002* (2013.01); *G06N 3/0454* (2013.01); *G06N 3/08* (2013.01); *H04N 19/61* (2014.11); *H04N 19/90* (2014.11)

(58) Field of Classification Search
CPC ...... G06K 9/62; G06K 9/6267; G06K 9/4628; G06K 9/00624; G06K 9/6271; G06K 9/00; G06N 3/049; G06N 3/0454; G06N 3/08; G06N 3/0545; G06T 9/002; G06T 19/00; G06T 7/564; G06T 7/73; G06T 7/74; G06T 19/006; H04N 19/90; H04N 19/61
USPC .................. 382/239, 190, 158, 209; 430/566
See application file for complete search history.

(56) References Cited

U.S. PATENT DOCUMENTS

| | | | | |
|---|---|---|---|---|
| 4,658,428 | A * | 4/1987 | Bedros .................. | G06T 3/0006 382/216 |
| 9,111,349 | B2 * | 8/2015 | Szeliski ............. | G06K 9/00214 |
| 9,269,022 | B2 * | 2/2016 | Rhoads .............. | G06K 9/00208 |
| 9,799,098 | B2 * | 10/2017 | Seung .................... | G06K 9/342 |
| 9,847,974 | B2 * | 12/2017 | Kompalli ........... | G06K 9/00442 |
| 2010/0158332 | A1 * | 6/2010 | Rico .................... | A61B 5/0033 382/128 |

(Continued)

FOREIGN PATENT DOCUMENTS

CN 107609638 A * 1/2018

*Primary Examiner* — Mahendra R Patel
(74) *Attorney, Agent, or Firm* — Staas & Halsey LLP

(57) ABSTRACT

An image processing apparatus and an image processing method where the apparatus includes: a self-encoder configured to perform self-encoding on an input image to generate multiple feature maps; a parameter generator configured to generate multiple convolution kernels for a convolution neural network based on the multiple feature maps; and an outputter configured to generate, by using the convolution neural network, an output result of the input image based on the input image and the multiple convolution kernels. With the image processing apparatus and the image processing method according to the present disclosure, an accuracy of processing an image by using the CNN network can be improved.

18 Claims, 6 Drawing Sheets

(56) References Cited

U.S. PATENT DOCUMENTS

| | | | | |
|---|---|---|---|---|
| 2010/0166320 | A1* | 7/2010 | Paquier | G06K 9/4623 |
| | | | | 382/209 |
| 2016/0358068 | A1* | 12/2016 | Brothers | G06N 3/082 |
| 2016/0379083 | A1* | 12/2016 | Sala | G06T 7/75 |
| | | | | 345/633 |
| 2017/0228520 | A1* | 8/2017 | Kidd | G06F 19/3462 |
| 2017/0344882 | A1* | 11/2017 | Ambrose | G06N 3/0454 |
| 2018/0032844 | A1* | 2/2018 | Yao | G06K 9/80 |
| 2018/0068463 | A1* | 3/2018 | Risser | G06T 7/45 |
| 2018/0075343 | A1* | 3/2018 | van den Oord | G06N 3/0445 |
| 2018/0077538 | A1* | 3/2018 | Matus | H04W 4/023 |
| 2018/0189981 | A1* | 7/2018 | Singh | G06T 9/002 |
| 2018/0300624 | A1* | 10/2018 | El-Khamy | G06N 3/04 |
| 2018/0336434 | A1* | 11/2018 | Kicanaoglu | G06K 9/6271 |
| 2019/0114510 | A1* | 4/2019 | Bremer | G06K 9/6271 |
| 2019/0385325 | A1* | 12/2019 | Kweon | G06T 3/4007 |

* cited by examiner

IMAGE PROCESSING APPARATUS AND IMAGE PROCESSING METHOD

CROSS REFERENCE

This application claims the benefit and priority of Chinese Application No. 201710976964.3, filed on Oct. 19, 2017, entitled "image processing apparatus and image processing method", the entire disclosure of which is incorporated herein by reference.

FIELD

The embodiments of the present disclosure relate to the field of image processing, in particular, to an image processing apparatus and an image processing method, and more particularly to an image processing apparatus and an image processing method for performing facial landmark detection.

BACKGROUND

The background part provides background information related to the present disclosure, which is not necessarily the conventional technology.

Deep learning technology has been widely applied in the field of computer vision. With a convolutional neural network (CNN), which is one of the deep learning techniques, the accuracy of image classification and image recognition is greatly improved, thereby realizing an end-to-end learning mechanism in which an input is directly converted into an output, thus bringing a qualitative change to image processing. The CNN network may be applied to fields such as image detection/recognition and sequence signal processing and application. For example, in a task of facial landmark detection, an input image including a face image may be input to a CNN network to output facial landmarks.

In a conventional CNN network, the convolution kernel for a convolution operation is changeless. That is, the same convolution kernel is used for different input images. However, in fields such as image detection/recognition and sequence signal processing and application, the complexity in learning of the CNN network is increased due to variability and complexity of the input image (for example, a head may present different poses in the task of facial landmark detection). In addition, the same convolution kernel is used for processing different input images, thereby resulting in an inaccurate output result.

In view of the above technical problems, it is expected to provide a solution according to the present disclosure, with which the accuracy of processing an image by using a CNN network can be improved.

SUMMARY

This summary part provides a general summary of the present disclosure, rather than discloses a full scope or all features thereof.

An image processing apparatus and an image processing method are provided according to the present disclosure, with which an accuracy of processing an image by using the CNN network can be improved.

According to an aspect of the present disclosure, an image processing apparatus is provided, which includes: a self-encoder configured to perform self-encoding on an input image to generate multiple feature maps; a parameter generator configured to generate multiple convolution kernels for a convolution neural network based on the multiple feature maps; and an outputter configured to generate, by using the convolution neural network, an output result of the input image based on the input image and the multiple convolution kernels.

According to another aspect of the present disclosure, an image processing method is provided, which includes: performing self-encoding on an input image to generate multiple feature maps; generating multiple convolution kernels for a convolution neural network based on the multiple feature maps; and generating, by using the convolution neural network, an output result of the input image based on the input image and the multiple convolution kernels.

According to another aspect of the present disclosure, a machine-readable storage medium in which a program product including machine-readable instruction codes stored therein is carried, where the machine-readable instruction codes, when being read and executed by a computer, cause the computer to perform the image processing method according to the present disclosure.

According to another aspect of the present disclosure, a machine-readable storage medium in which a program product including machine-readable instruction codes stored therein is carried, where the machine-readable instruction codes, when being read and executed by a computer, cause the computer to perform the image processing method according to the present disclosure.

With the image processing apparatus and the image processing method according to the present disclosure, multiple feature maps may be generated for an input image, and multiple convolution kernels for a convolution neural network are generated based on the multiple feature maps, such that an output result of the input image is generated by using the convolution neural network. In this case, the convolution kernel in the convolutional neural network is not changeless. That is, a convolution kernel corresponding to a specific input image may be generated for the input image, and the generated convolution kernel is more closely matched with the input image, such that the convolutional neural network processes the image (for example, image recognition and image detection and the like) more accurately.

The description and specific examples in the summary are only illustrative and are not intended to limit the scope of the present disclosure.

BRIEF DESCRIPTION OF THE DRAWINGS

The drawings described herein are for illustrative purposes only of selected embodiments but not all possible implementations, and are not intended to limit the scope of the present disclosure. In the drawings.

Figure 1:
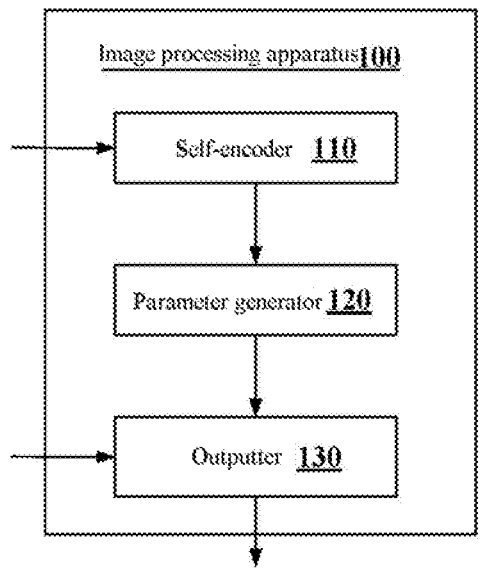
FIG. 1 is a structural block diagram showing an image processing apparatus according to an embodiment of the present disclosure.

Although the present disclosure is susceptible to various modifications and substitutions, specific embodiments thereof are shown in the drawings as an example and are described in detail herein. However, it should be understood that the description for specific embodiments herein is not intended to limit the present disclosure into a disclosed particular form, but rather, the present disclosure aims to cover all modifications, equivalents and substitutions within the spirit and scope of the present disclosure. It should be noted that, throughout the drawings, a numeral indicates a component corresponding to the numeral.

DETAILED DESCRIPTION OF EMBODIMENTS

Examples of the present disclosure are described more fully with reference to the drawings now. The following description is merely exemplary substantively and is not intended to limit the present disclosure and an application or use thereof.

Example embodiments are provided so that this disclosure is thorough, and fully convey the scope to those skilled in the art. Examples of various specific details, such as specific elements, devices, and methods, are set forth to provide thorough understanding for the embodiments of the present disclosure. It is apparent to those skilled in the art that specific details need not be employed and that example embodiments may be embodied in many different forms, none of which should be construed to limit the scope of the disclosure. Well-known processes, structures and technology are not described in detail in some exemplary embodiments.

An image processing apparatus 100 according to the present disclosure is described below with reference to FIG. 1.

The image processing apparatus 100 according to the present disclosure may include a self-encoder 110, a parameter generator 120 and an outputter 130.

According to an embodiment of the present disclosure, the self-encoder 110 is configured to perform self-encoding on an input image to generate multiple feature maps. Here, an input of the self-encoder 110 includes an input image, that is, an image to be performed by image processing, and an output includes multiple feature maps. According to an embodiment of the present disclosure, the self-encoder 110 may generate multiple feature maps with any self-encoding method known in the conventional technology. Further, the self-encoder 110 may input the generated multiple feature maps to the parameter generator 120.

According to an embodiment of the present disclosure, the parameter generator 120 is configured to generate multiple convolution kernels for a convolution neural network based on the multiple feature maps. Here, an input of the parameter generator 120 includes multiple feature maps, and an output of the parameter generator 120 includes multiple convolution kernels for the convolution neural network. According to an embodiment of the present disclosure, the parameter generator 120 may receive multiple feature maps from the self-encoder 110, and may output the generated multiple convolution kernels to the outputter 130.

According to an embodiment of the present disclosure, the outputter 130 is configured to generate, by using the convolution neural network, an output result of the input image based on the input image and the multiple convolution kernels. Here, an input of the outputter 130 includes an input image and multiple convolution kernels, and an output of the outputter 130 includes an output result of the input image. According to an embodiment of the present disclosure, the outputter 130 may receive the multiple convolution kernels from the parameter generator 120, and may output the generated output result from the image processing apparatus 100. Further, an input image input to the outputter 130 is the same image as an input image input to the self-encoder 110. That is, multiple convolution kernels corresponding to the input image may be generated by the self-encoder 110 and the parameter generator 120, and then the output result corresponding to the input image may be generated by the outputter.

As described above, with the image processing apparatus 100 according to the present disclosure, multiple feature maps may be generated for the input image, and multiple convolution kernels for the convolution neural network are generated based on the multiple feature maps, such that the output result of the input image is generated by using the convolution neural network. In this case, the convolution kernel in the convolutional neural network is not changeless. That is, a convolution kernel corresponding to a specific input image may be generated for the input image, and the generated convolution kernel is more closely matched with the input image, such that the convolutional neural network processes the image (for example, image recognition and image detection and the like) more accurately.

Figure 2:
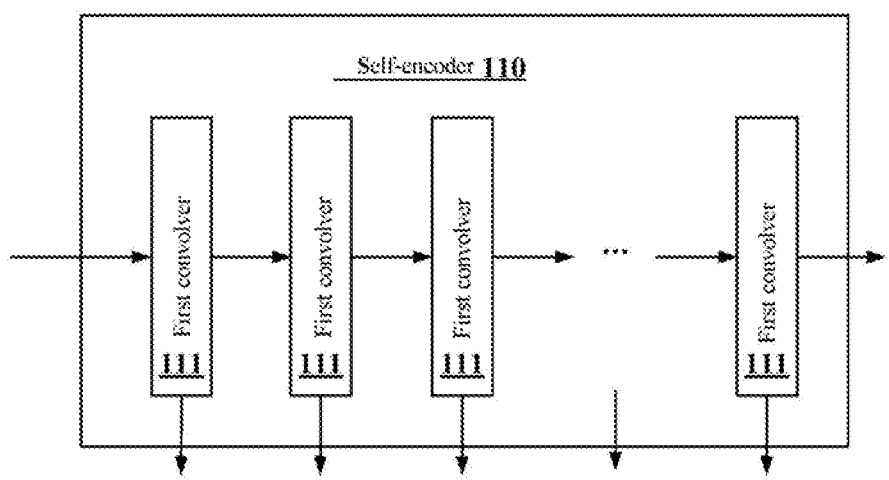
FIG. 2 is a structural block diagram showing a self-encoder in an image processing apparatus according to an embodiment of the present disclosure.

FIG. 2 is a structural block diagram showing the self-encoder 110 in the image processing apparatus 100 according to an embodiment of the present disclosure. As shown in FIG. 2, the self-encoder 110 may include multiple first convolvers 111, and the self-encoder 110 is configured to input the input image to the multiple first convolvers 111 in sequence to generate the multiple feature maps respectively.

According to an embodiment of the present disclosure, the self-encoder 110 may be implemented with a convolutional neural network CNN. That is, the first convolver 111 in the self-encoder 110 is a convolution layer in the convolutional neural network CNN. Here, the number of the first convolvers 111 in the self-encoder 110 may be set according to actual needs, which is not limited in the present disclosure.

As shown in FIG. 2, the input image is input to the multiple first convolvers 111 in sequence from left to right. Specifically, the input image is input to the first first convolver 111, to generate a first feature map and output the first feature map to the outside of the self-encoder 110 and a second first convolver 111. Next, the second first convolver 111 generates a second feature map, and output the second feature map to the outside of the self-encoder 110 and a third first convolver 111. In this manner, an output of a previous first convolver 111 is used as an input of a latter first convolver 111, such that the number of generated feature maps is the same as the number of the first convolvers 111.

Figure 3:
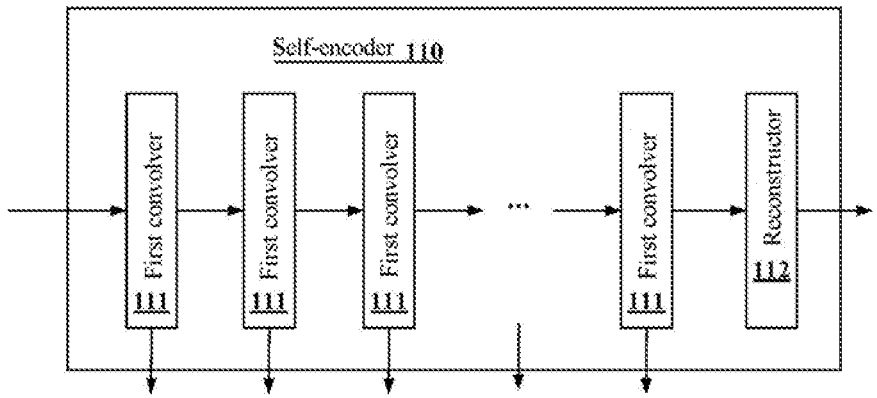
FIG. 3 is a structural block diagram showing a self-encoder in an image processing apparatus according to another embodiment of the present disclosure.

FIG. 3 is a structural block diagram showing the self-encoder 110 in the image processing apparatus 100 according to another embodiment of the present disclosure. As shown in FIG. 3, the self-encoder 110 may further include a reconstructor 112 configured to generate a reconstructed image of the input image. Specifically, an output of the last first convolver 111 in the self-encoder 110 is used as an input to the reconstructor 112, and an output of the reconstructor 112 is used as the reconstructed image of the input image.

Figure 4:
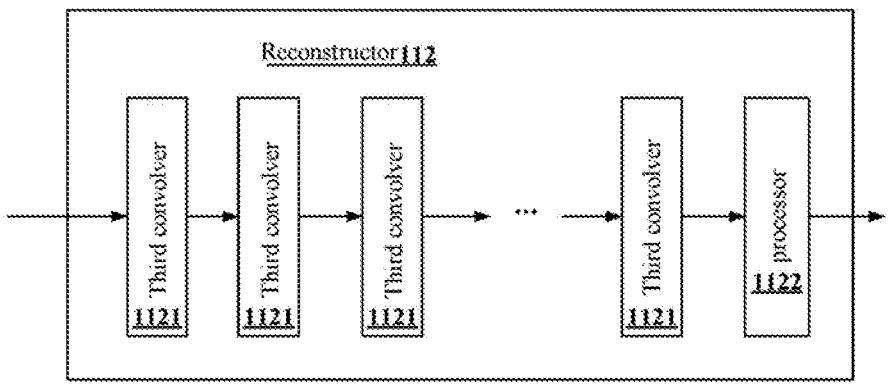
FIG. 4 is a structural block diagram showing a reconstructor in a self-encoder according to an embodiment of the present disclosure.

FIG. 4 is a structural block diagram showing the reconstructor 112 in the self-encoder 110 according to an embodiment of the present disclosure. As shown in FIG. 4, the reconstructor 112 may include multiple third convolvers 1121 and a processor 1122. An output of the last first convolver 111 in the self-encoder 110 is input to the multiple third convolvers 1121 and the processor 1122 in sequence to generate the reconstructed image of the input image. Here, the number of the third convolvers 1121 in the reconstructor 112 may be set according to actual needs, which is not limited in the present disclosure.

According to an embodiment of the present disclosure, the reconstructor 112 is mainly used in a training phase, and the reconstructor 112 is not used in a case of generating the output result of the input image in an actual testing phase. Furthermore, the first convolver 111 in the self-encoder 110 may perform a downsampling operation, to make features of an extracted feature map more compact. The third convolver 1121 in the reconstructor 112 may perform an upsampling operation, to make a size of the reconstructed image is consistent with a size of the input image.

As described above, the self-encoder 110 is described by taking the convolutional neural network CNN as an example. It is to be noted that the present disclosure is not limited to the embodiments, and any unit capable of realizing a self-encoding function to output multiple feature maps may be used as the self-encoder 110.

Figure 5:
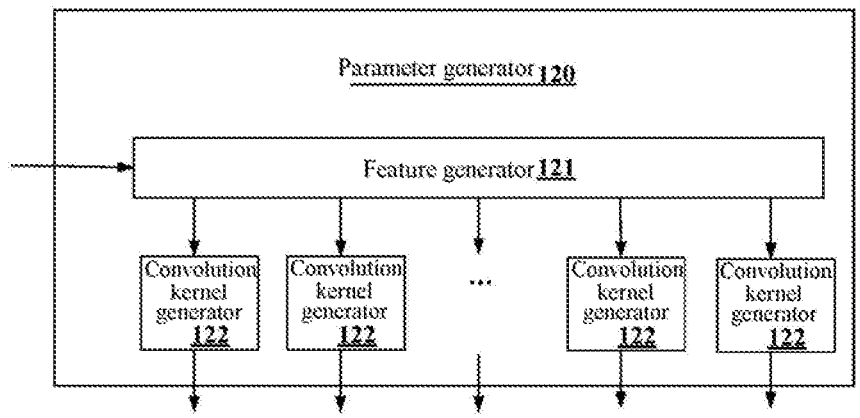
FIG. 5 is a structural block diagram showing a parameter generator in an image processing apparatus according to an embodiment of the present disclosure.

FIG. 5 is a structural block diagram showing the parameter generator 120 in the image processing apparatus 100 according to an embodiment of the present disclosure. As shown in FIG. 5, the parameter generator 120 may include a feature generator 121 and a convolution kernel generator 122.

According to an embodiment of the present disclosure, the feature generator 121 is configured to generate, for each of the multiple feature maps, a local feature and a global feature corresponding to the feature map. Here, the feature generator 121 may receive multiple feature maps from the self-encoder 110, and generate a local feature and a global feature for each of the feature maps. Further, the feature generator 121 may input the local feature and the global feature corresponding to each of the feature maps to the convolution kernel generator 122.

According to an embodiment of the present disclosure, the convolution kernel generator 122 is configured to generate, for each of the multiple feature maps, a convolution kernel corresponding to the feature map based on the local feature and the global feature corresponding to the feature map. Here, the parameter generator 120 may include one convolution kernel generator 122, and may also include multiple convolution kernel generators 122. In a case where the parameter generator 120 includes one convolution kernel generator 122, the feature generator 121 may input the local feature and the global feature corresponding to each of the feature maps to the convolution kernel generator 122 in sequence, to generate a convolution kernel corresponding to each of the feature maps by the convolution kernel generator 122. In a case where the number of the convolution kernel generators 122 included in the parameter generator 120 is equal to the number of feature maps generated by the self-encoder 110, the feature generator 121 may input the local feature and the global feature corresponding to each of the feature maps to the multiple convolution kernel generators 122 respectively, and each of the convolution kernel generators 122 generates a convolution kernel corresponding to a feature map (a situation shown in FIG. 5). In a case where the number of convolution kernel generators 122 included in the parameter generator 120 is greater than 1 and is smaller than the number of feature maps generated by the self-encoder 110, the feature generator 121 may group the multiple feature maps, the number of groups being equal to the number of the convolution kernel generators 122, to input the local feature and the global feature corresponding to each of the feature maps in each group to a corresponding convolution kernel generator 122 respectively.

According to an embodiment of the present disclosure, the feature generator 121 may generate the local feature and the global feature corresponding to each of the feature maps by the following operations: generating, for each of the multiple feature maps, the local feature corresponding to the feature map; and generating, for each of the multiple feature maps, the global feature corresponding to the feature map based on the generated multiple local features.

According to an embodiment of the present disclosure, the local feature characterizes a feature of each of the feature maps. That is, a local feature of a feature map is only associated with the feature map. Therefore, the feature generator 121 may generate, for each of the multiple feature maps, a local feature corresponding to the feature map. Further, a global feature of a feature map is associated with all of the feature maps outputted by the self-encoder 110. Therefore, it is required to consider the local features of all the feature maps in a case where the feature generator 121 generates the global feature of each of the feature maps.

According to an embodiment of the present disclosure, the feature generator 121 may generate a local feature corresponding to each of the feature maps by the following operation: performing a pooling operation on the feature map to generate a local feature corresponding to the feature map.

According to an embodiment of the present disclosure, the feature generator 121 may perform an averaging pooling operation on the feature map, and may also perform a maximum pooling operation on the feature map, which is not limited in the present disclosure. Here, the feature map may be regarded as a three-dimensional matrix. The performing the averaging pooling operation on the feature map includes: acquiring an average value for each layer of the three-dimensional matrix, to obtain a feature vector as the local feature. The performing the maximum pooling operation on the feature image includes: acquiring a maximum value for each layer of the three-dimensional matrix, to obtain a feature vector as the local feature. In this way, the feature generator 121 may generate a local feature corresponding to each of the feature maps.

According to an embodiment of the present disclosure, the feature generator 121 may generate a global feature corresponding to each of the feature maps by the following operations: connecting the generated multiple local features; and inputting the connected multiple local features to a fully connected network (FC) to generate global features. The fully connected networks through which the global features corresponding to different feature maps are generated are different.

Figure 6:
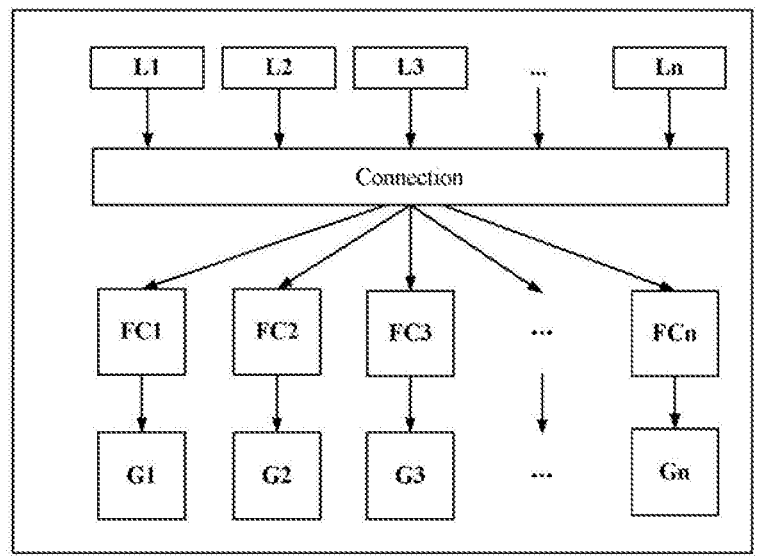
FIG. 6 is a schematic diagram showing a process of generating a local feature and a global feature corresponding to each of feature maps according to an embodiment of the present disclosure.

FIG. 6 is a schematic diagram showing a process of generating a local feature and a global feature corresponding to each of the feature maps according to an embodiment of the present disclosure. As shown in FIG. 6, L1 to Ln respectively represent local features of the first feature map to the n-th feature map (n is an integer greater than 1), G1 to Gn respectively represent global features of the first feature map to the n-th feature map, and FC1 to FCn respectively represent the first fully connected network to the n-th fully connected network.

As shown in FIG. 6, after the local features L1 to Ln respectively for the feature maps are generated, the n local features are connected, and the connected n local features are respectively input to the n fully connected networks, to generate n global features. That is, the connected L1 to Ln are input to FC1 to generate G1, which is referred to as the global feature corresponding to the first feature map, and the connected L1 to Ln are input to FC2 to generate G2, which is referred to as the global feature corresponding to the second feature map, . . . , the connected L1 to Ln are input to FCn to generate Gn, which is referred to as the global feature corresponding to the n-th feature map. It can be seen that the global feature corresponding to each of the feature maps is associated with the local features of all of the feature maps.

According to an embodiment of the present disclosure, the convolution kernel generator 122 generates a convolution kernel corresponding to the feature map by the following operations: performing nonlinear mapping on connected local feature and global feature to generate a weight matrix; and generating a convolution kernel corresponding to the feature map based on the weight matrix and a reference convolution kernel set. The reference convolution kernel set includes multiple convolution kernels, and the weight matrix includes a weight for each of the convolution kernels in the reference convolution kernel set.

Figure 7:
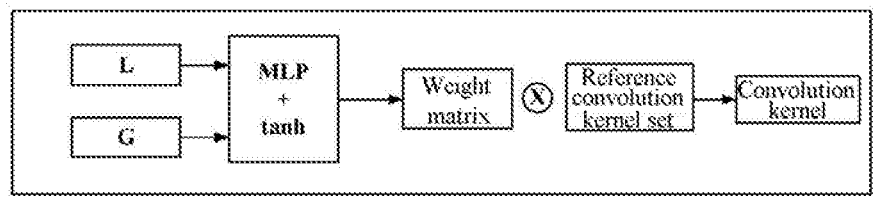
FIG. 7 is a schematic diagram showing a process of generating a convolution kernel corresponding to each of feature maps according to an embodiment of the present disclosure.

FIG. 7 is a schematic diagram showing a process of generating a convolution kernel corresponding to each of the feature maps according to an embodiment of the present disclosure. As shown in FIG. 7, L represents a local feature for any one of the feature maps, G represents a global feature for any one of the feature maps, MLP represents a multi-layer perception, an output value may be limited within a range of [−1, 1] with a tan h function, and a nonlinear mapping function may be implemented with the MLP+tan h function. First, a non-linear mapping is performed on the connected L and G to generate a weight matrix, and then a convolution kernel corresponding to the feature map is generated based on the weight matrix and the reference convolution kernel set. Specifically, the convolution operation is performed on the weight matrix and the reference convolution kernel set to generate a convolution kernel corresponding to the feature map. Here, the reference convolution kernel set may include multiple convolution kernels, which may be obtained by training, and the weight matrix includes a weight for each of the convolution kernels in the reference convolution kernel set. That is, a weighting operation is performed on multiple convolution kernels in the reference convolution kernel set to generate a convolution kernel for each of the feature maps, and a weighted coefficient is determined based on the local feature and the global feature corresponding to the feature map. In this way, the generated convolution kernel is more closely matched with the input image, such that the image processing apparatus 100 processes an input image more accurately.

Figure 8:
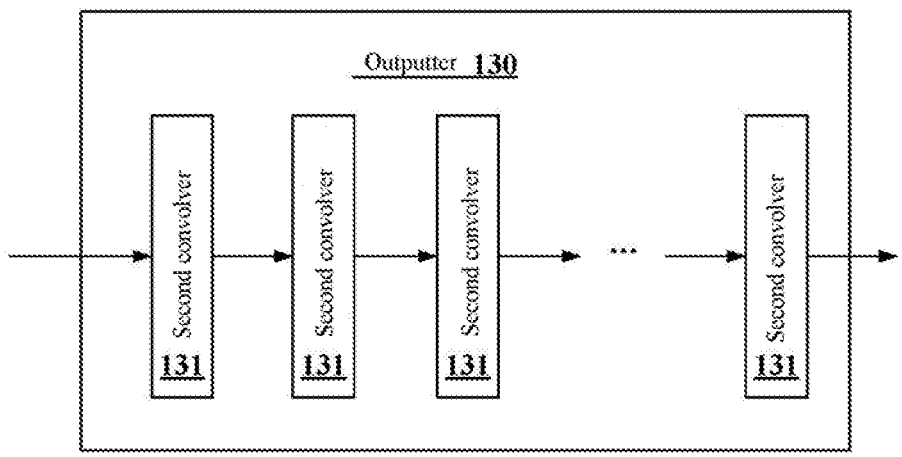
FIG. 8 is a structural block diagram showing an outputter in an image processing apparatus according to an embodiment of the present disclosure.

FIG. 8 is a structural block diagram showing the outputter 130 in the image processing apparatus 100 according to an embodiment of the present disclosure. As shown in FIG. 8, the outputter 130 may include multiple second convolvers 131. The outputter 130 is configured to input the input image to the multiple second convolvers 131 in sequence to generate an output image. The multiple convolution kernels generated by the parameter generator 120 are respectively used for the multiple second convolvers 131.

According to an embodiment of the present disclosure, the outputter 130 may be implemented with a convolutional neural network CNN, that is, the second convolver 131 in the outputter 130 is a convolutional layer in the convolutional neural network CNN. Here, the number of the second convolvers 131 in the outputter 130 may be set according to actual needs, which is not limited in the present disclosure.

As shown in FIG. 8, the input image is input to the multiple second convolvers 131 in sequence from left to right. Here, the input image is the same as the input image input to the self-encoder 110. Specifically, the input image is input to the first second convolver 131, to generate a first feature map, and output the first feature map to the second second convolver 131. Next, the second second convolver 131 generates a second feature map and output the second feature map to the third second convolver 131. In this way, an output of a previous second convolver 131 is used as an input of a latter second convolver 131.

Figure 9:
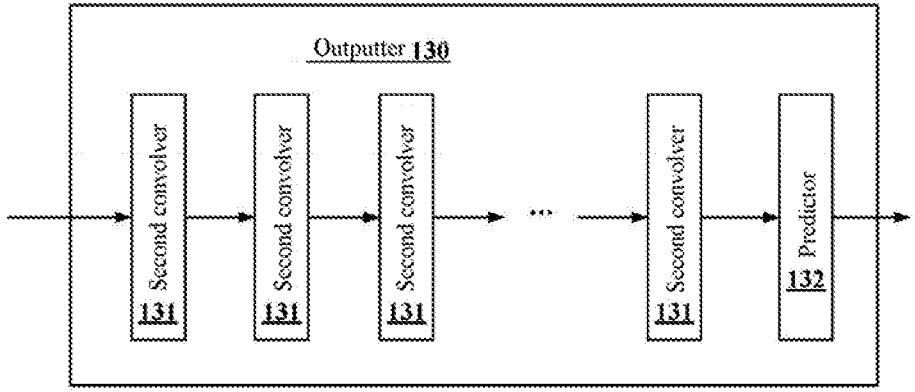
FIG. 9 is a structural block diagram showing an outputter in an image processing apparatus according to another embodiment of the present disclosure.

FIG. 9 is a structural block diagram showing the outputter 130 in the image processing apparatus 100 according to another embodiment of the present disclosure. As shown in FIG. 9, the outputter 130 may further include a predictor 132 configured to generate an output result of the input image. Specifically, an output of the last second convolver 131 in the outputter 130 is used as an input of the predictor 132, and an output of the predictor 132 is used as the output result of the input image.

Figure 10:
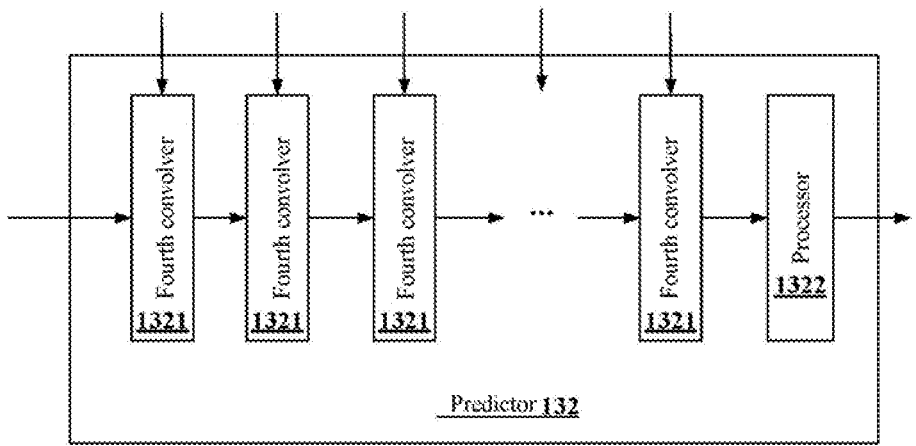
FIG. 10 is a structural block diagram showing a predictor in an outputter according to an embodiment of the present disclosure.

FIG. 10 is a structural block diagram showing the predictor 132 in the outputter 130 according to an embodiment of the present disclosure. As shown in FIG. 10, the predictor 132 may include multiple fourth convolvers 1321 and a processor 1322. An output of the last second convolver 131 in the outputter 130 is input to the multiple fourth convolvers 1321 and the processor 1322 in sequence to generate an output result of the input image. Here, the number of the fourth convolvers 1321 in the predictor 132 may be set according to actual needs, which is not limited in the present disclosure.

As described above, the self-encoder 110 includes multiple first convolvers 111. The reconstructor 112 in the self-encoder 110 may include multiple third convolvers 1121. The outputter 130 may include multiple second convolvers 131. The predictor 132 in the outputter 130 may include multiple fourth convolvers 1321. According to an embodiment of the present disclosure, the first convolver 111, the second convolver 131, the third convolver 1121 and the fourth convolver 1321 may have the same structure, except that convolution kernels for the convolution operation are different.

Figure 11:
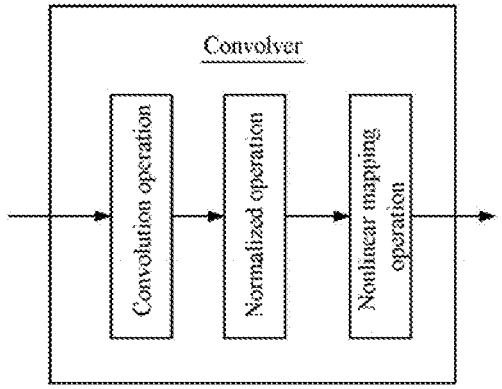
FIG. 11 is a structural block diagram showing a convolver according to an embodiment of the present disclosure.

FIG. 11 is a structural block diagram showing a convolver according to an embodiment of the present disclosure. As shown in FIG. 11, each of the first convolver 111, the second convolver 131, the third convolver 1121 and the fourth convolver 1321 may perform the following operations: performing a convolution operation on an image input to the convolver and a convolution kernel for the convolver; performing a normalized operation on the convolution result; and performing a non-linear mapping operation on the normalized result.

According to an embodiment of the present disclosure, the convolution kernel for the first convolver 111 may be obtained by training, and the convolution kernel for the second convolver 131 is generated by the parameter generator 120, the convolution kernel for the third convolver 1121 is obtained by training, and the convolution kernel for the fourth convolver 1321 is also obtained by training.

The self-encoder 110, the parameter generator 120 and the outputter 130 of the image processing apparatus 100 according to an embodiment of the present disclosure are described in detail above. An overall processing flow of the image processing apparatus 100 is described below with reference to FIG. 12.

Figure 12:
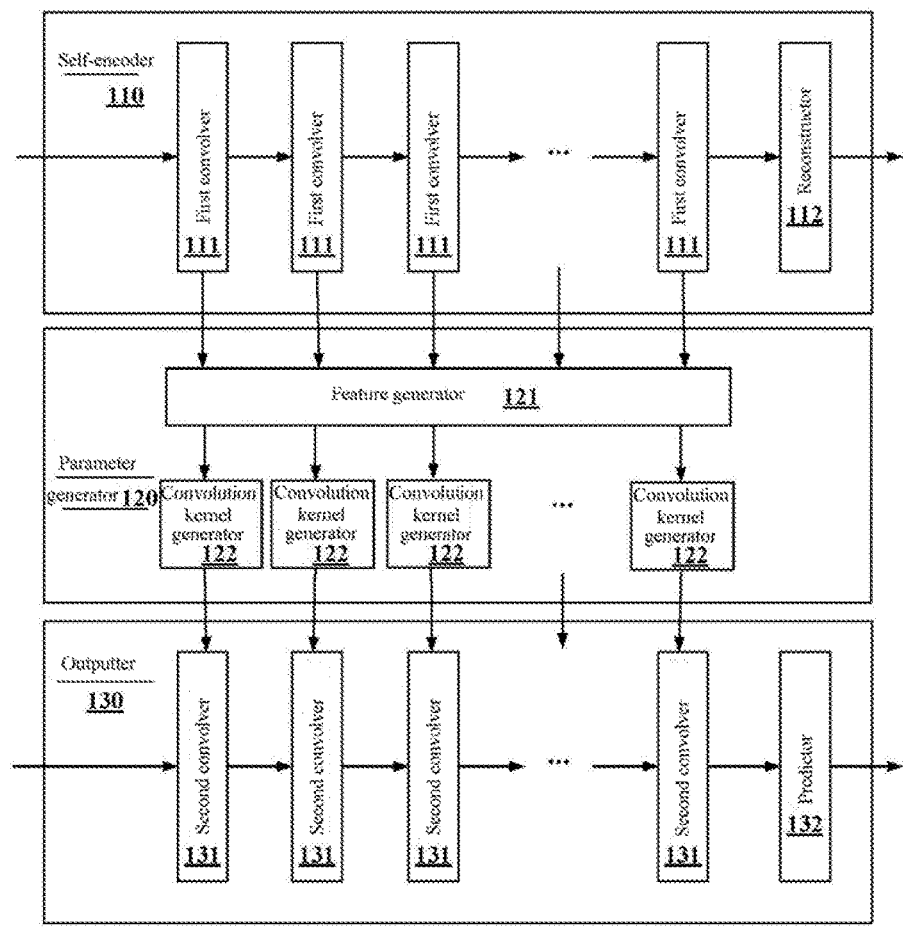
FIG. 12 is a schematic diagram showing global functions of an image processing apparatus in performing image processing according to an embodiment of the present disclosure.

FIG. 12 is a schematic diagram showing global functions of an image processing apparatus 100 in performing image processing according to an embodiment of the present disclosure. It is required to train the image processing apparatus 100 through two training stages before the image processing apparatus 100 performs the image processing. In a first training phase, multiple training images may be used, and each of the training images is input to the self-encoder 110, and is input to the multiple first convolvers 111 and the reconstructor 112 in sequence to generate a reconstructed image of the training image. By learning the training image and the reconstructed image thereof, the self-encoder 110 may be trained, for example, to obtain a convolution kernel for each of the multiple first convolvers 111 in the self-encoder 110 and a convolution kernel for each of the multiple third convolvers 1121 in the reconstructor 112. It is to be noted that in the first training phase, the obtained convolution kernel is a convolution kernel to be optimized, and is not a convolution kernel used by the image processing apparatus 100 in an actual image processing. Next, in a second training phase, multiple training images of which output results are known may be used, each of the training images may be input to the self-encoder 110 and the outputter 130. Specifically, each of the training images is input to the multiple first convolvers 111 and the reconstructor 112 in sequence to generate multiple feature maps and reconstructed images of the training images. By learning the training image and the reconstructed image thereof, the self-encoder 110 may be trained again, for example, the convolution kernel for each of the first convolvers 111 and the convolution kernel for each of the third convolvers 1121 obtained in the first training phase are optimized, to obtain a convolution kernel used by the image processing apparatus 100 in an actual image processing. Further, the multiple feature maps obtained by the self-encoder 110 are input to the parameter generator 120 and the outputter 130, to obtain an output result of the training image. By comparing the known output result of the training image with the obtained output result of the training image, the parameter generator 120 and the outputter 130 may be trained, for example, to obtain the following parameters: a parameter (a weight and the like) of the fully connected network used in the parameter generator 120, a parameter in the MLP used in the parameter generator 120, the convolution kernels included in the reference convolution kernel set and the convolution kernel for each of the multiple fourth convolvers 1321 of the Predictor 132 in the outputter 130 and the like.

After the above two training phases are completed, the image processing apparatus 100 may process the input image. First, the input image is input to the self-encoder 110 to generate multiple feature maps, and the parameter generator 120 generates a convolution kernel corresponding to each of the feature maps based on the multiple feature maps. Next, the input image is input to the outputter 130, and the outputter 130 outputs the output result of the input image using the convolution kernel generated by the parameter generator 120.

According to an embodiment of the present disclosure, the image processing apparatus 100 may be applied to facial landmark detection. In this case, the input image includes a face image, and the output result includes a feature recognition result for the face image. Here, the output result may be in a form of an image or in a form of coordinates. In the case of outputting an image, the output result may include multiple output images, and each of the output images represents a landmark of the face. For example, in the output image, a pixel value at a position of a landmark is 1, and a pixel value at a position other the landmark is 0. In the case of outputting coordinates, the output result may include coordinates for each of the landmarks. Here, the face may include multiple landmarks such as a left eye, a right eye, a nose, a left mouth corner and a right mouth corner.

In addition, the present disclosure may also be applied to other fields such as image detection/recognition and sequence signal processing and application. Form of outputs for different input images may be different, which are not limited in the present disclosure. Generally, the output result should include information that is required to be recognized from the input image.

The image processing apparatus 100 according to the embodiment of the present disclosure is described in detail above. Next, an image processing method according to an embodiment of the present disclosure is described in detail.

Figure 13:
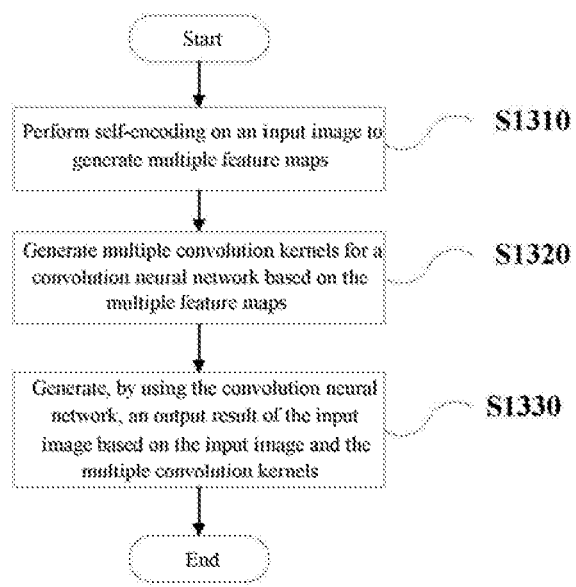
FIG. 13 is a flow chart showing an image processing method according to an embodiment of the present disclosure.

FIG. 13 is a flow chart showing an image processing method according to an embodiment of the present disclosure.

As shown in FIG. 13, in step S1310, self-encoding is performed on an input image, to generate multiple feature maps.

Next, in step S1320, multiple convolution kernels for a convolution neural network are generated based on the multiple feature maps.

Next, in step S1330, an output result of the input image are generated by using the convolution neural network based on the input image and the multiple convolution kernels.

Preferably, the performing self-encoding on the input image to generate the multiple feature maps includes: inputting the input image to the multiple convolvers in sequence to generate the multiple feature maps.

Preferably, the generating the multiple convolution kernels for the convolutional neural network based on the multiple feature maps includes performing, for each of the multiple feature maps, the following operations: generating a local feature and a global feature corresponding to the feature map; and generating a convolution kernel corresponding to the feature map based on the local feature and the global feature.

Preferably, the generating the local feature and the global feature corresponding to the feature map includes: generating, for each of the multiple feature maps, the local feature corresponding to the feature map; and generating, for each of the multiple feature maps, the global feature corresponding to the feature map based on the generated multiple local features.

Preferably, a pooling operation is performed on the feature map to generate the local feature corresponding to the feature map.

Preferably, the generating the global feature corresponding to the feature map based on the generated multiple local features includes: connecting the generated multiple local features; and inputting the connected multiple local features to the fully connected network to generate global features. The fully connected networks through which the global features corresponding to different feature maps are generated are different.

Preferably, the generating the convolution kernel corresponding to the feature map based on the local feature and the global feature includes: performing nonlinear mapping on connected local feature and global feature to generate a weight matrix; and generating a convolution kernel corresponding to the feature map based on the weight matrix and a reference convolution kernel set. The reference convolution kernel set includes multiple convolution kernels, and the weight matrix includes a weight for each of the convolution kernels in the reference convolution kernel set.

Preferably, the generating the output image based on the input image and the multiple convolution kernels includes: inputting the input image to the multiple convolvers in the convolutional neural network in sequence to generate an output image. The multiple convolution kernels are respectively used for the multiple convolvers in the convolution neural network.

Preferably, the inputting the input image to each of the convolvers includes: performing a convolution operation on the image input to the convolver and the convolution kernel for the convolver; performing a normalized operation on the convolution result; and performing a nonlinear mapping on the normalized result.

Preferably, the input image includes a face image, and the output result includes a feature recognition result for the face image.

The image processing method described above may be implemented by the image processing apparatus 100 according to the embodiments of the present disclosure. Therefore, the various embodiments of the image processing apparatus 100 described above are suitable here, and are not repeated here.

It can be seen that with the image processing apparatus and the image processing method according to the present disclosure, multiple feature maps may be generated for an input image, and multiple convolution kernels for a convolution neural network are generated based on the multiple feature maps, then an output result of the input image is generated by using the convolution neural network. In this case, the convolution kernel in the convolutional neural network is not changeless. That is, a convolution kernel corresponding to a specific input image may be generated for the input image, and the generated convolution kernel is more closely matched with the input image, such that the convolutional neural network processes the image (for example, image recognition and image detection and the like) more accurately.

It is apparent that various operations of the image processing method according to the present disclosure may be implemented in a manner of computer-executable programs stored in various machine-readable storage mediums.

In addition, the present disclosure may be implemented by providing a storage medium, in which the above executable program codes are stored, directly or indirectly to a system or a device, and a computer or a central processor (CPU) of the system or the device reads and executes the above program codes. In this case, as long as the system or the device has a function of executing programs, the embodiments of the present disclosure are not limited to programs. The programs may be of any form, for example, target programs, programs executed by an explainer or scripts provided to the operating system.

The machine-readable storage medium described above includes, but is not limited to, various memories and storage units, a semiconductor device, a disk unit such as an optic disk, a magnetic disk and a magneto-optic disk, and other medium suitable for storing information.

In addition, the technical solutions of the present disclosure may also be implemented by the following way. The computer downloads and installs the computer program codes according to the present disclosure, via a corresponding web site connected to the Internet, and then executes the programs.

Figure 14:
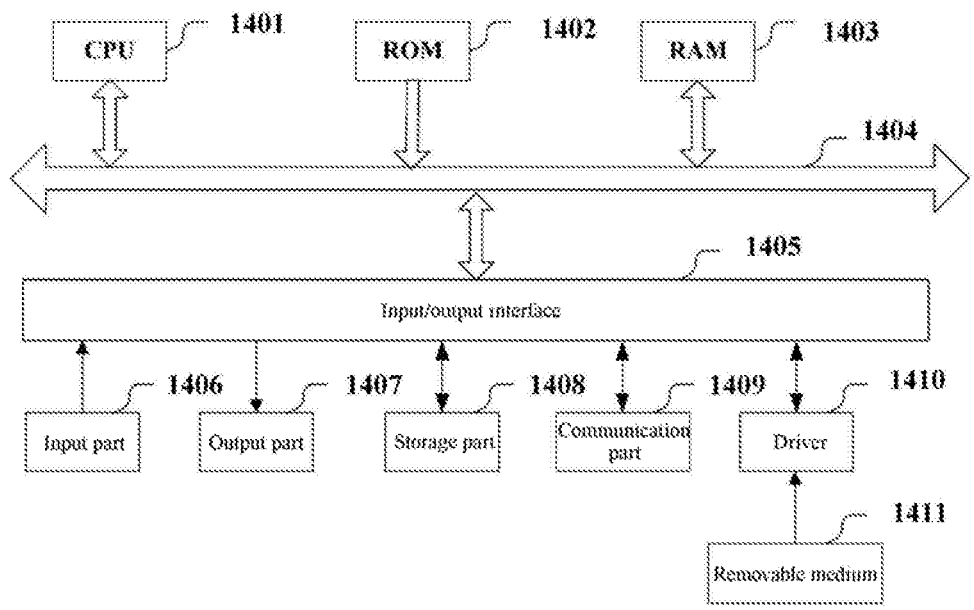
FIG. 14 is a block diagram of an exemplary structure of a general purpose personal computer which can implement the image processing method according to the present disclosure.

FIG. 14 is a block diagram of an exemplary structure of a general purpose personal computer which can implement the image processing method according to the present disclosure.

As shown in FIG. 14, a CPU 1401 performs various processing according to a program stored in a read-only memory (ROM) 1402 or a program loaded to a random access memory (RAM) 1403 from a storage section 1408. The data needed for the various processing of the CPU 1401 may be stored in the RAM 1403 as needed. The CPU 1401, the ROM 1402, and the RAM 1403 are connected to each other via a bus 1404. An input/output interface 1405 is also connected to the bus 1404.

The input/output interface 1405 is connected with an input part 1406 (including a keyboard, a mouse and the like), an output part 1407 (including a display such as a Cathode Ray Tube (CRT) and a Liquid Crystal Display (LCD), a loudspeaker and the like), a storage part 1408 (including a hard disk), and a communication part 1409 (including a network interface card such as a LAN card, a modem and the like). The communication part 1409 performs communication processing via a network such as the Internet. A driver 1410 may be connected with the input/output interface 1405 as needed. A removable medium 1411 such as a magnetic disk, an optical disk, a magneto-optical disk and a semiconductor memory is installed in the driver 1410 as needed, such that a computer program read from the removable medium 1411 may be installed in the storage part 1408 as needed.

If the foregoing series of processing above is implemented by software, a program constituting the software is installed from the network such as the Internet or a memory medium such as the removable medium 1411.

It should be understood by those skilled in the art that the memory medium is not limited to the removable medium 1411 shown in FIG. 14 in which the program is stored and which is distributed separately from the device so as to provide the program to the user. An example of the removable medium 1411 includes a magnetic disk (including a floppy disk (registered trademark)), an optical disk (including a compact disk read only memory (CD-ROM) and a digital versatile disk (DVD)), a magneto-optical disk (including a mini-disc (MD) (registered trademark)) and a semiconductor memory. Alternatively, the storage medium may be a ROM 1402, a hard disk included in the storage part 1408, etc., which has a program stored therein and is distributed to the user along with a device in which they are incorporated.

In the system and the method of the present disclosure, it is apparent that units or steps may be decomposed and/or recombined. These decompositions and/or recombinations shall be regarded as equivalent solutions of the present disclosure. In addition, steps for performing the series of processing described above may be performed naturally according to the order described and in the time order, but the steps are not necessary to be performed in the time order. Some steps may be performed in parallel or independently from each other.

Although the embodiments of the disclosure have been described above in detail in connection with the drawings, it is appreciated that the embodiments as described above are merely illustrative but not limitative of the disclosure. Those skilled in the art can make various modifications and variations to the above embodiments without departing from the spirit and scope thereof. Therefore, the scope of the disclosure is defined merely by the appended claims and their equivalents.

The invention claimed is:

1. An image processing apparatus, comprising:
  a memory; and
  a processor coupled to the memory and configured to:
    perform self-encoding on an input image to generate multiple feature maps,
    generate, for each of the multiple feature maps, a local feature and a global feature corresponding to a corresponding feature map,
    generate, for each of the multiple feature maps, a generated convolution kernel corresponding to the corresponding feature map based on the local feature and the global feature corresponding to the corresponding feature map, and
    generate, by using a convolution neural network, an output result for the input image based on the input image and multiple convolution kernels corresponding to the multiple feature maps.

2. The image processing apparatus according to claim 1, wherein the processor is further configured to:
  generate, for each of the multiple feature maps, the local feature corresponding to the corresponding feature map; and
  generate, for each of the multiple feature maps, the global feature corresponding to the corresponding feature map based on the multiple local features generated.

3. The image processing apparatus according to claim 2, wherein the processor is further configured to perform a pooling operation on the corresponding feature map to generate the local feature corresponding to the corresponding feature map.

4. The image processing apparatus according to claim 2, wherein the processor is further configured to:
  connect generated multiple local features; and
  input connected multiple local features to a fully-connected network to generate the global feature,
    wherein fully-connected networks through which the global features corresponding to different feature maps are generated are different.

5. The image processing apparatus according to claim 1, wherein the processor is further configured to:
  perform nonlinear mapping on a connected local feature and a connected global feature to generate a weight matrix; and
  generate a convolution kernel corresponding to the corresponding feature map based on the weight matrix and a reference convolution kernel set,
    wherein the reference convolution kernel set includes multiple convolution kernels, and the weight matrix includes a weight for each of the multiple convolution kernels in the reference convolution kernel set.

6. The image processing apparatus according to claim 1, wherein the processor is further configured to input the input image to multiple second convolvers in sequence to generate an output image,
  wherein the multiple convolution kernels are respectively used for the multiple second convolvers.

7. The image processing apparatus according to claim 6, wherein each of the multiple second convolvers is configured to perform the following operations:
  performing a convolution operation on an image input to a second convolver and a convolution kernel for the second convolver;
  performing a normalized operation on a convolution result; and
  performing a nonlinear mapping on a normalized result.

8. The image processing apparatus according to claim 1, wherein the input image includes a face image, and the output result includes a feature recognition result for the face image.

9. An image processing method, including:
  performing self-encoding on an input image to generate multiple feature maps;
  performing, for each of the multiple feature maps, the following operations:
    generating a local feature and a global feature corresponding to a corresponding feature map,
    generating a convolution kernel corresponding to the corresponding feature map based on the local feature and the global feature corresponding to the corresponding feature map, and
    generating, by using a convolution neural network, an output result for the input image based on the input image and multiple convolution kernels corresponding to the multiple feature maps.

10. The image processing method according to claim 9, wherein the generating the local feature and the global feature corresponding to the corresponding feature map includes:
  generating, for each of the multiple feature maps, the local feature corresponding to the corresponding feature map; and
  generating, for each of the multiple feature maps, the global feature corresponding to the corresponding feature map based on the generated multiple local features.

11. The image processing method according to claim 10, wherein a pooling operation is performed on the corresponding feature map to generate the local feature corresponding to the corresponding feature map.

12. The image processing method according to claim 10, wherein the generating the global feature corresponding to the corresponding feature map based on the generated multiple local features includes:
  connecting generated multiple local features; and
  inputting connected multiple local features to a fully-connected network to generate the global feature, wherein fully-connected networks through which the global features corresponding to different feature maps are generated are different.

13. The image processing method according to claim 9, wherein the generating the convolution kernel corresponding to the corresponding feature map based on the local feature and the global feature includes:
performing nonlinear mapping on a connected local feature and a connected global feature to generate a weight matrix; and
generating a convolution kernel corresponding to the corresponding feature map based on the weight matrix and a reference convolution kernel set,
wherein the reference convolution kernel set includes multiple convolution kernels, and the weight matrix includes a weight for each of the multiple convolution kernels in the reference convolution kernel set.

14. The image processing method according to claim 9, wherein the generating the output image based on the input image and the multiple convolution kernels includes:
inputting the input image to multiple convolvers in the convolutional neural network in sequence to generate an output image,
wherein the multiple convolution kernels are respectively used for the multiple convolvers.

15. The image processing method according to claim 14, wherein the inputting the input image to each of the convolvers includes:
performing a convolution operation on an image input to a convolver and a convolution kernel for the convolver;
performing a normalized operation on a convolution result; and
performing a nonlinear mapping on a normalized result.

16. A non-transitory machine readable storage medium on which a program product comprising machine readable instruction codes are carried, wherein the instruction codes, when being read and executed by a computer, cause the computer to perform the method according to claim 9.

17. The image processing apparatus according to claim 1, wherein the processor is further configured to input the input image to multiple convolvers in sequence to generate the multiple feature maps.

18. The image processing method according to claim 9, wherein the performing self-encoding on the input image to generate the multiple feature maps includes:
inputting the input image to multiple convolvers in sequence to generate the multiple feature maps.

* * * * *